FRANCIS LEE FARIES, OF WILKESBARRE, PENNSYLVANIA.

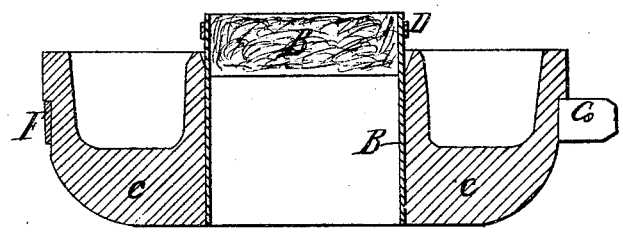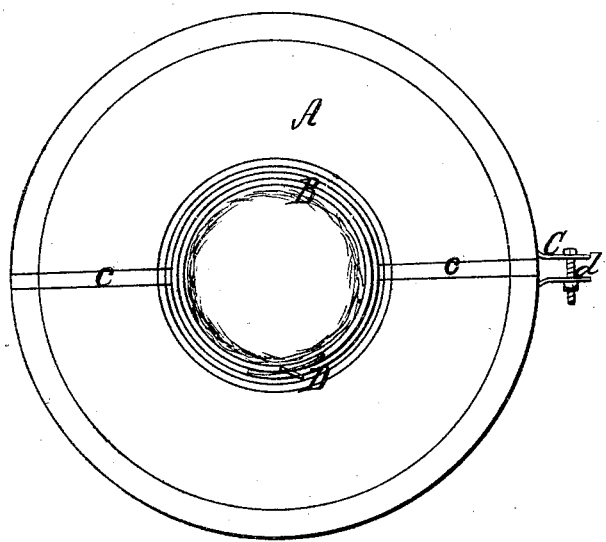

Letters Patent No. 86,382, dated February 2, 1869; antedated January 7, 1869.

IMPROVEMENT IN TREE-PROTECTOR.

The Schedule referred to in these Letters Patent and making part of the same.

*To all whom it may concern:*

Be it known that I, FRANCIS LEE FARIES, of Wilkesbarre, in the county of Luzerne, and State of Pennsylvania, have invented certain new and useful Improvements in Tree-Protectors; and I do hereby declare that the following is a full, clear, and exact description thereof, reference being had to the accompanying drawings, and to the letters of reference marked thereon, which form a part of this specification, in which—

Figure 1 is a central section, and

Figure 2, a plan view of my tree-protector.

The object of my invention is to protect fruit and other trees from the ravages of the caterpillar or other insects; and to this end My invention consists in the employment of a wooden or metal box, of peculiar construction, and in combination therewith a belt of sheepskin or other suitable material, and a regulating or adjusting-strap, all used substantially as hereinafter described.

To enable others to make and use my invention, I will now describe its construction and operation.

In the accompanying drawings—

A represents a box, which may be constructed either of wood or metal.

This box is made into two parts, with a circular channel of about one-half of its depth, into which may be placed tar, oil, or any other suitable substance, when placed around the tree, in order to protect it from the ravages of insects, as already stated.

B designates pieces of sheepskin, having their ends overlapping each other, and permanently secured on the inner circumference of the box A, at its lower end, and provided with a regulating-strap, D, by means of which it may be adjusted to trees of various dimensions.

At the point where the box is separated, and on each side of the opening therein, are inserted strips of rubber, c, to prevent leakage.

C designates a spring-metal band, passing around the box A, and terminating at its ends in lips, through which passes or is inserted a bolt, d, provided with a nut. By means of this arrangement the box A may be securely fastened around the tree.

F designates a metal spring, placed across the opening in the box, and secured to the box on each side of the opening.

The advantage of my protector, which I claim over those in ordinary use is, that it can be adapted to trees of various sizes, thus doing away with employing protectors of different circumferences.

Having thus described my invention,

What I claim as new, and desire to secure by Letters Patent, is—

1. The employment of the belts of sheepskin, so arranged as to overlap, and provided with the adjusting-strap D, as and for the purpose set forth.

2. In combination with the above, box A, constructed as described, and provided with a spring-metal band, and secured substantially in the manner specified.

In testimony that I claim the foregoing as my own, I affix my signature in presence of two witnesses.

FRANCIS LEE FARIES.

Witnesses:
HENRY S. ANHISEL,
ELIAS ROBINS.